No. 757,259. PATENTED APR. 12, 1904.
L. BROWN.
HORSE HAY RAKE.
APPLICATION FILED DEC. 15, 1903.
NO MODEL.
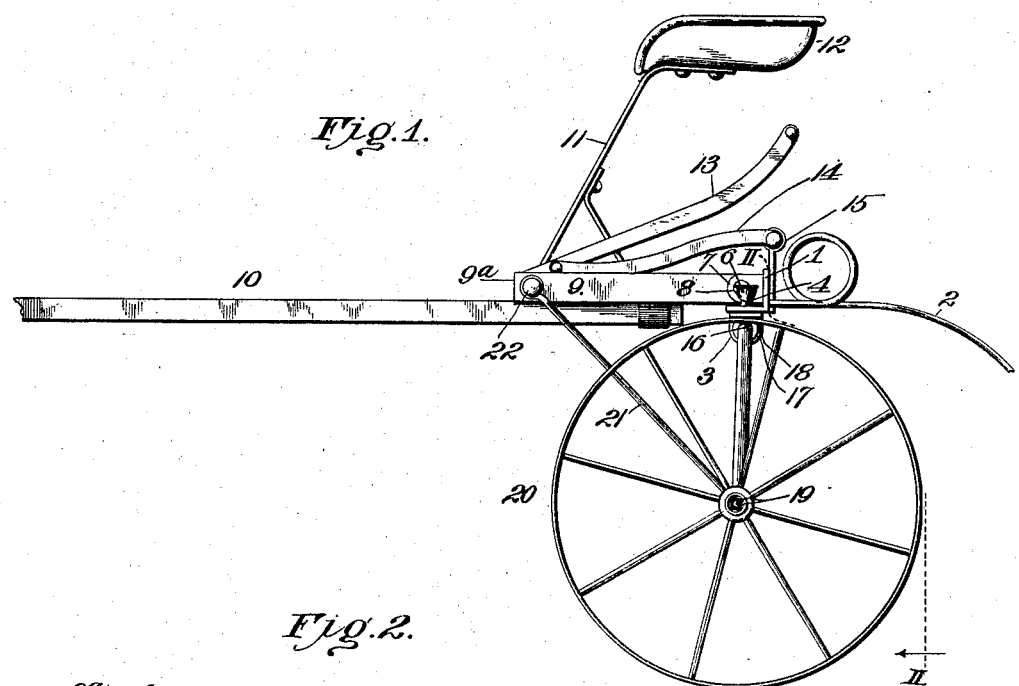
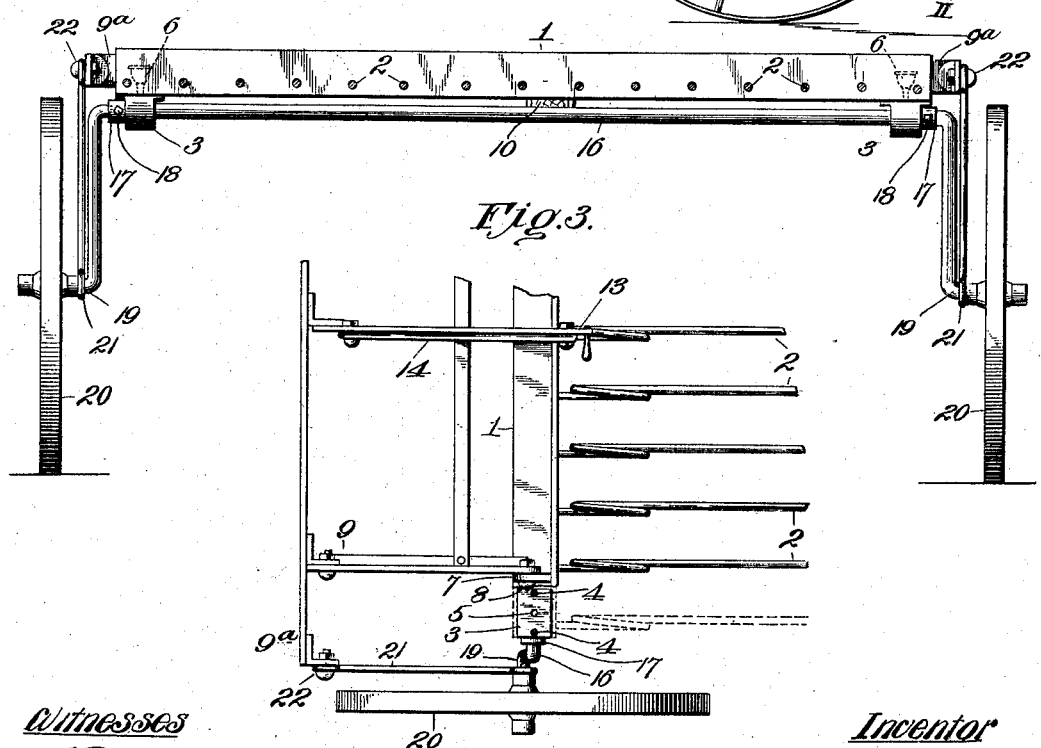
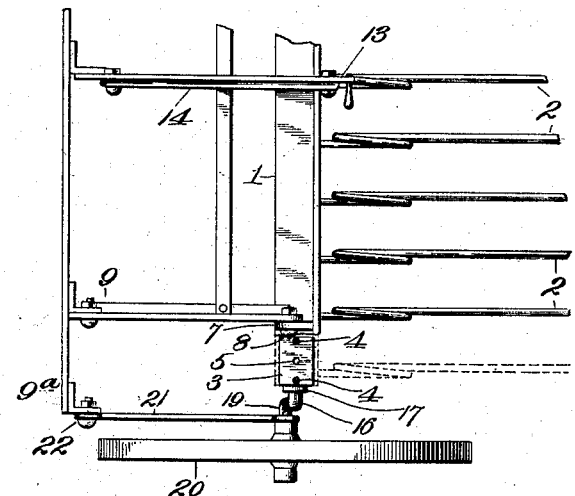
Witnesses
F. R. Glow
H. C. Rodgers
Inventor
Luther Brown
By George H. Thorpe
Atty.
THE NORRIS PETERS CO., PHOTO-LITHO., WASHINGTON, D. C.

No. 757,259. Patented April 12, 1904.

UNITED STATES PATENT OFFICE.

LUTHER BROWN, OF PLATTE COUNTY, MISSOURI.

HORSE HAY-RAKE.

SPECIFICATION forming part of Letters Patent No. 757,259, dated April 12, 1904.

Original application filed September 24, 1903, Serial No. 174,384. Divided and this application filed December 15, 1903. Serial No. 185,195. (No model.)

*To all whom it may concern:*

Be it known that I, LUTHER BROWN, a citizen of the United States, residing in the county of Platte and State of Missouri, have invented certain new and useful Improvements in Horse Hay-Rakes, of which the following is a specification.

This invention relates to low-wheel hay-rakes for raking the ground close to the trunks of fruit-trees without injury to the latter or the fruit thereon; and my object is to produce a cheap and efficient rake of this character.

To this end the invention consists in certain peculiarities of construction and organization, as hereinafter described and claimed, and in order that it may be fully understood reference is to be had to the accompanying drawings, in which—

Figure 1 is a side view of a hay-rake embodying my invention. Fig. 2 is a section taken on the line II II of Fig. 1 with the parts above the teeth-carrying bar omitted. Fig. 3 is a top plan view of a part of the rake with one end of the teeth-carrying bar broken away to disclose one of the bearings of the arched axle.

In the said drawings, 1 designates a transverse horizontally-arranged angle-bar equipped with rearwardly-projecting teeth 2 and provided at each end with depending bearings 3, the latter by preference being bolted to the bar, as at 4, though they may be otherwise secured. They are also provided with openings 5 to receive oil from the cups 6.

7 designates lugs rigidly carried by the angle-bar and pivotally connected, as at 8, to the substantially horizontal frame 9, which frame surmounts the rear end of and is secured to the tongue 10 in any suitable manner and is provided with lateral extensions $9^a$. Said frame is equipped, as usual, with the standard 11, provided with a seat 12 and with the usual lever 13, and said lever is pivotally connected by link 14 with the arm 15, rigidly secured in any suitable manner to the teeth-carrying bar, the arrangement being such that the forward operation of the lever swings the teeth-carrying frame in a forward and upward direction, the rearward operation of the lever in turn reversing such movement of said bar for the purpose of lowering the teeth to their operative position.

All of the parts thus far described are well known and are in common use.

16 designates an arched axle having its bridge portion journaled in bearings 3 and secured from endwise movement therein by collars 17, said collars being secured upon the axle at the desired point by set-screws 18. The upright portions or cranks of the axle terminate in outturned ends 19, equipped with carrying-wheels 20, and pivotally connected at their lower ends with said outturned ends of the axles are braces 21, said braces being inclined forwardly and upwardly and having their upper ends pivoted, as at 22, to frame extensions $9^a$.

In the operation of raising and lowering the teeth of this machine, as hereinbefore explained, the entire superstructure of the machine is slightly lowered, as is customary in this class of machines, the weight of the parts, supplemented by that of the operator, assisting in raising the teeth to dumping position, and in such operation as the teeth-carrying bar turns on pivots 8 the axle swings slightly rearward and the wheels move very slightly in the same direction, the bearings rigid with the teeth-carrying bar turning on the arched portion of the axle to accommodate such movement. As a pending application on horse hay-rake, which I filed September 24, 1903, Serial No. 174,384, and of which this is a divisional application, shows in dotted lines the positions of the parts when the rake-teeth are elevated, it is deemed unnecessary to show such relation in this application.

From the above description it will be apparent that I have produced a hay-rake embodying the features of advantage enumerated as desirable in the statement of invention and in addition thereto that of simplicity, strength, and durability of construction, and while I have illustrated and described the preferred embodiment of the same it will be apparent that it is susceptible of change without departing from the principle of construction involved.

Having thus described the invention, what I claim as new, and desire to secure by Letters Patent, is—

1. A hay-rake, comprising a tongue and a seat-carrying frame, a transverse bar equipped with rake-teeth pivoted to said frame to turn about a horizontal axis, bearings secured to said bar, an arched axle having its bridge portion fitting loosely in said bearings, wheels journaled on the crank portions of said axle, inclined braces pivotally connecting said frame with the cranks of said axle below its bridge portion, and means for rotating the teeth-carrying bar and for securing it in position with its teeth elevated or lowered.

2. A hay-rake, comprising a tongue, a seat-carrying frame having lateral extensions, a transverse bar equipped with rake-teeth and pivoted to said frame for movement about a horizontal axis, bearings secured to said bar, an arched axle having its bridge portion fitting loosely in said bearings, means to prevent endwise movement of the axle in said bearings, wheels journaled on the crank portions of said axle, inclined braces pivotally connecting the crank portions of the axle with the extensions of said frame, and means for rotating the teeth-carrying bar and for securing it in position with its teeth elevated or lowered.

In testimony whereof I affix my signature in the presence of two witnesses.

LUTHER BROWN.

Witnesses:
WILLIAM KLASTERMEIR,
WM. A. ROWE.